Aug. 1, 1944.    E. F. FISHER    2,354,675
DUST COLLECTION AND REDUCTION APPARATUS
Filed Dec. 2, 1941
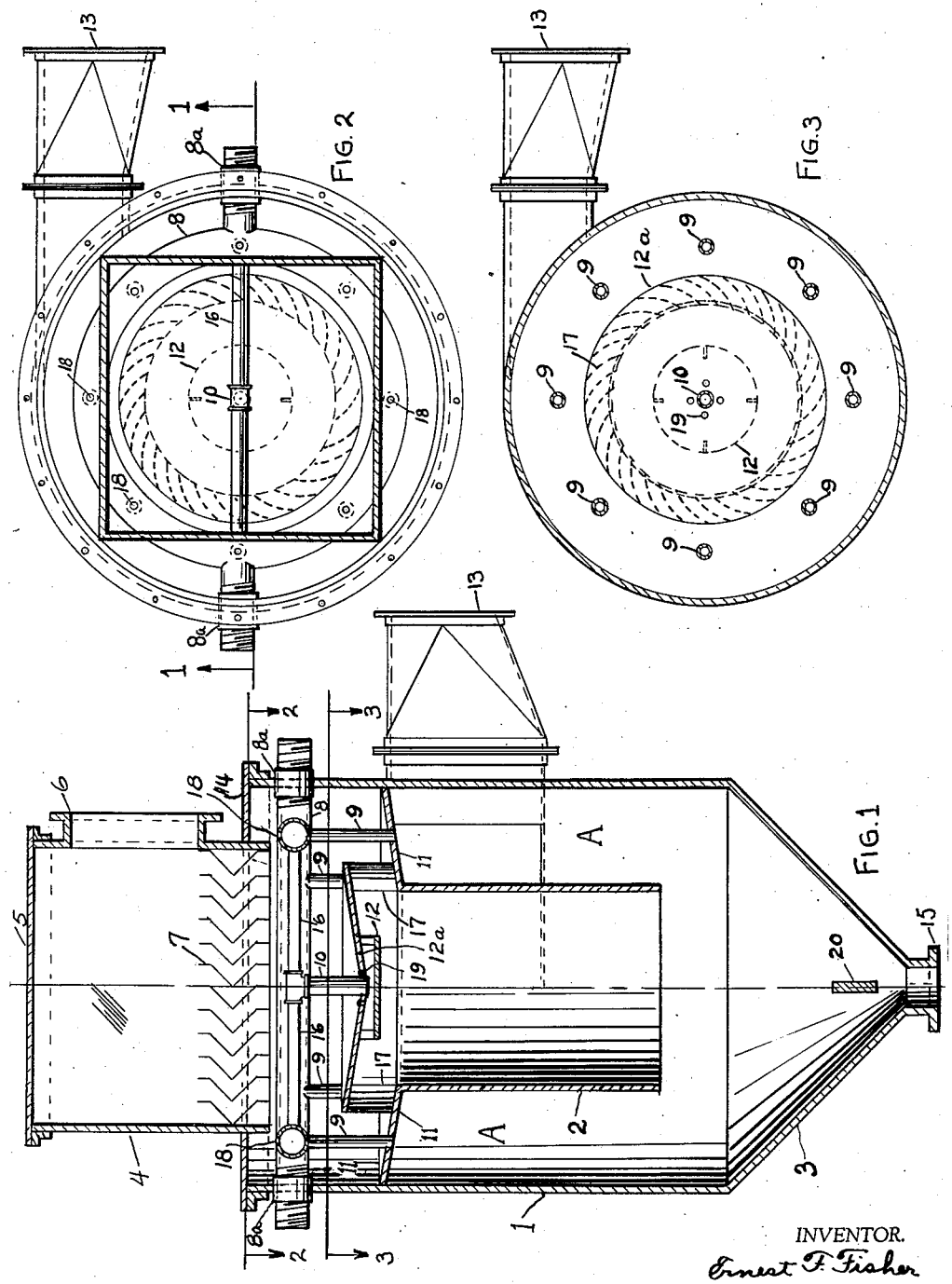
INVENTOR.
Ernest F. Fisher Patented Aug. 1, 1944

2,354,675

UNITED STATES PATENT OFFICE 2,354,675

DUST COLLECTION AND REDUCTION APPARATUS

Ernest F. Fisher, Passaic, N. J.

Application December 2, 1941, Serial No. 421,323

2 Claims. (Cl. 183—22)

My invention relates to improvements in apparatus for the reduction of explosive dusts such as magnesium resulting from polishing and grinding operations on magnesium castings, to a harmless sludge.

One object is to provide an apparatus in which air laden with explosive dust may be separated from the dust and the dust reduced to a harmless sludge which may be safely handled, while the air may be discharged to the atmosphere free from the hazardous dust.

Another object of my invention is to provide an apparatus of the class described that is simple in construction and efficient in operation.

These objects as well as other advantages inherent in the invention, will be apparent from a detailed description of the same in connection with the accompanying drawing in which:

Figure 1 is a vertical sectional elevation taken on line 1—1 of Figure 2. Figure 2 is a horizontal section taken on line 2—2 of Figure 1. Figure 3 is likewise a horizontal section taken on line 3—3 of Figure 1.

Referring to Figure 1 for the present, the cylindrical tank 1 with the conical bottom 3 form the body of my dust reduction apparatus. The ring baffle plate 11 with the depending tube 2 divides the body into two sections, the lower section with the tangential dust laden air inlet 13, and the upper section with impingement vanes 17, water distributing plate 12, disk baffle plate 12a, and water distributing pipes 8, 9 and 10. A similar water distributing plate is shown and claimed in my application Ser. No. 367,312, filed November 27, 1940. The upper section of the body is covered by the air tight cover 14 and chamber 4 thereabove is covered by air tight plate 5. Chamber 4 has a clean air outlet 6. Within chamber 4 are mist eliminator plates 7 which separate water mist from the cleaned air. The pipe couplings 8a serve to facilitate the placement of water ring 8 within the upper section. After water ring 8 is in place, the couplings 8a are welded in wall of upper section.

Water ring 8 supplies water to water distributing plate 12 through pipe 10 which is connected to the ring through pipes 16. Water ring 8 also distributes water to annular chamber A through pipes 9. Above each of pipes 9 and centered therewith are holes 18 in water ring 8. These holes serve the purpose of cleaning out pipes 9 in case of clogging when dirty water is circulated in water ring 8. Around the water pipe 10 in plate 12a are holes 19 which serve to drain any water that accumulates on this plate.

Baffle 20 in bottom of cone 3 serves to prevent a swirl of water at the drain outlet 15 as such a swirl prevents the ready flow of water through drain 15.

The operation of the dust reduction apparatus is as follows: Dust laden air enters the body of the apparatus through tangential inlet 13 and swirls around the annular space A formed by the tube 2 and wall of tank 1. This rapidly swirling air comes in contact with the streams of the outer series of water issuing from water pipes 9 whose ends are flush with the underside of ring baffle plate 11. It will be noted that inlet 13 admits the air immediately under baffle plate 11 so that this surface receives an intense wiping action of both air and water, so that both the underside of baffle 11 and every part of the annular chamber A are copiously washed with water leaving no surface to which dust can adhere. Such dust is washed down in conical bottom 3 and drains through outlet 15.

This whirling action continues upward through tube 2 and outward through curved impingement vanes 17. In swirling upward through tube 2 and vanes 17, the swirling air comes in contact with the copiously wetted wall of tube 2 and vanes 17. Vanes 17 are wetted by water thrown from plate 12 by the centrifugal force of the whirling air, as well as by the spreading action of the plate itself, due to its being positioned directly below the discharge end of pipe 10. This water is thrown violently against the surface of the vanes and washes the impinged dust onto baffle plate 11 from whence it flows down the inside wall of tube 2 into cone 3. Because of the high angular velocity of the swirling air in tube 2, most of the remaining dust is impinged on wetted wall of tube 2 while the remaining dust is impinging on the wetted vanes 17.

The cleaned air passes through the impingement vanes 17 into the upper section where it is separated from any entrained water by the eliminator plates 7 and finally is exhausted through the outlet 6.

There being no baffles or other obstructions in the lower section formed by the annular space A, and this space being copiously washed with water, no dust can accumulate in this section. Confining all water piping to the upper section where there is only clean air, keeps the interior clean at all times, and free from explosion hazards.

Having thus described my invention, I claim as new and wish to protect by Letters Patents:

1. A dust reduction and collection apparatus, comprising in combination a vertical casing, a tangential inlet for admitting dust laden air to said casing, a large open ended cylinder vertically positioned in said casing, at about the level of the tangential inlet and defining a large annular swirling space between itself and the casing, a ring baffle at the upper part of said cylinder and extending to the inner wall of the casing, above the tangential inlet a solid disk baffle, larger than said cylinder and positioned above the upper end thereof, and overlapping said ring baffle, impingement vanes positioned between the overlapping portions of the disk baffle and ring baffle, said disk baffle being provided with a central aperture, a water distributing plate substantially smaller than said solid disk baffle and directly below said disk baffle and below said central aperture therein and positioned directly in the path of water issuing downwardly from said aperture, means for delivering water through said aperture onto said distributing plate, which serves to direct it laterally into and over the entire surface of said impingement vanes, means passing through said ring baffle for spraying water into the upper part of said large annular swirling space, and an outlet for cleaned air in the upper part of said casing.

2. A dust reduction and collection apparatus, comprising in combination a vertical casing, a tangential inlet for admitting dust laden air to said casing, a large open ended cylinder vertically positioned in said casing, at about the level of the tangential inlet and defining a large annular swirling space between itself and the casing, a ring baffle at the upper part of said cylinder and extending to the inner wall of the casing, above the tangential inlet a solid disk baffle, larger than said cylinder and positioned above the upper end thereof, and overlapping said ring baffle, impingement vanes positioned between the overlapping portions of the disk baffle and ring baffle, said disk baffle being provided with a central aperture, a water distributing plate substantially smaller than said solid disk baffle and directly below said disk baffle and below said central aperture therein and positioned directly in the path of water issuing downwardly from said aperture, means for delivering water through said aperture onto said distributing plate, which serves to direct it laterally into and over the entire surface of said impingement vanes, means passing through said ring baffle for spraying water into the upper part of said large annular swirling space, a common pipe manifold for supplying water to said central aperture in the distributing plate and to the means for spraying water into the swirling space, an outlet for cleaned air in the upper part of the casing.

ERNEST F. FISHER.